(12) United States Patent
Gupta (10) Patent No.: US 8,613,092 B2
(45) Date of Patent: Dec. 17, 2013

(54) SYSTEM, METHOD AND COMPUTER PROGRAM PRODUCT FOR UPDATING A SECURITY SYSTEM DEFINITION DATABASE BASED ON PRIORITIZED INSTANCES OF KNOWN UNWANTED DATA

(75) Inventor: Manish Gupta, Bangalore (IN)

(73) Assignee: McAfee, Inc., Santa Clara, CA (US)

( * ) Notice: Subject to any disclaimer, the term of this patent is extended or adjusted under 35 U.S.C. 154(b) by 1246 days.

(21) Appl. No.: 11/751,565

(22) Filed: May 21, 2007

(65) Prior Publication Data
US 2013/0247130 A1    Sep. 19, 2013

(51) Int. Cl.
*G06F 12/16*    (2006.01)
(52) U.S. Cl.
USPC .................... 726/24; 726/22; 713/188
(58) Field of Classification Search
USPC ................. 726/22–24; 713/188
See application file for complete search history.

(56) References Cited

U.S. PATENT DOCUMENTS

| | | | |
|---|---|---|---|
| 6,301,668 B1 * | 10/2001 | Gleichauf et al. | 726/25 |
| 6,349,311 B1 | 2/2002 | Sobel et al. | 707/203 |
| 6,560,632 B1 * | 5/2003 | Chess et al. | 709/201 |
| 6,898,712 B2 * | 5/2005 | Vignoles et al. | 713/188 |
| 7,171,690 B2 | 1/2007 | Kouznetsov et al. | 726/22 |
| 7,219,239 B1 * | 5/2007 | Njemanze et al. | 726/3 |
| 7,415,728 B2 * | 8/2008 | Morohashi et al. | 726/25 |
| 7,594,270 B2 * | 9/2009 | Church et al. | 726/23 |
| 7,694,115 B1 * | 4/2010 | Porras et al. | 713/1 |
| 7,712,136 B2 * | 5/2010 | Sprosts et al. | 726/24 |
| 2003/0093514 A1 * | 5/2003 | Valdes et al. | 709/224 |
| 2003/0120951 A1 | 6/2003 | Gartside et al. | 713/201 |
| 2007/0261119 A1 * | 11/2007 | Jung et al. | 726/24 |
| 2008/0178288 A1 * | 7/2008 | Alperovitch et al. | 726/22 |
| 2009/0282476 A1 * | 11/2009 | Nachenberg et al. | 726/22 |

OTHER PUBLICATIONS

"eTrust® PestPatrol® Anti-Spyware Corporate Edition r8: Frequently Asked Questions" 2006 CA.
"ca Transforming IT Management" http://www3.ca.com/files_FAQs/etrust_pp_faqs.pdf.
McAfee Active Virus Defence: Desktop and Server Protection 2001 McAfee.com.

* cited by examiner

*Primary Examiner* — Amare F Tabor
(74) *Attorney, Agent, or Firm* — Patent Capital Group (57) ABSTRACT

A prioritized update system, method, and computer program product are provided. In use, a priority is assigned to a plurality of instances of known unwanted data. In addition, information associated with at least one of the instances of known unwanted data is communicated over a network for updating a system, based on the priority. In one embodiment, the prioritized update system may be provided for updating a security system definition database, based on prioritized instances of known unwanted data.

23 Claims, 7 Drawing Sheets

SYSTEM, METHOD AND COMPUTER PROGRAM PRODUCT FOR UPDATING A SECURITY SYSTEM DEFINITION DATABASE BASED ON PRIORITIZED INSTANCES OF KNOWN UNWANTED DATA

FIELD OF THE INVENTION

The present invention relates to security systems, and more particularly to distributing information associated with instances of known unwanted data.

BACKGROUND

Computer users are at increasing risk from various unwanted data (e.g. malware, spyware, key loggers, password crackers, etc.). Generally, new instances of known unwanted data are regularly identified, such that information associated therewith may be distributed to and utilized by systems for future detection purposes. However, communicating the information associated with the new instances of known unwanted data to such systems is typically inflicted with various limitations, such as, for example, network bandwidth limitations, delays in the communication of information associated with particular instances of known unwanted data, failure in updating new instances of data, etc.

There is thus a need for addressing these and/or other issues associated with the prior art.

SUMMARY

A prioritized update system, method, and computer program product are provided. In use, a priority is assigned to a plurality of instances of known unwanted data. In addition, information associated with at least one of the instances of known unwanted data is communicated over a network for updating a system, based on the priority. In one embodiment, the prioritized update system may be provided for updating a security system definition database, based on prioritized instances of known unwanted data.

DETAILED DESCRIPTION

Figure 1:
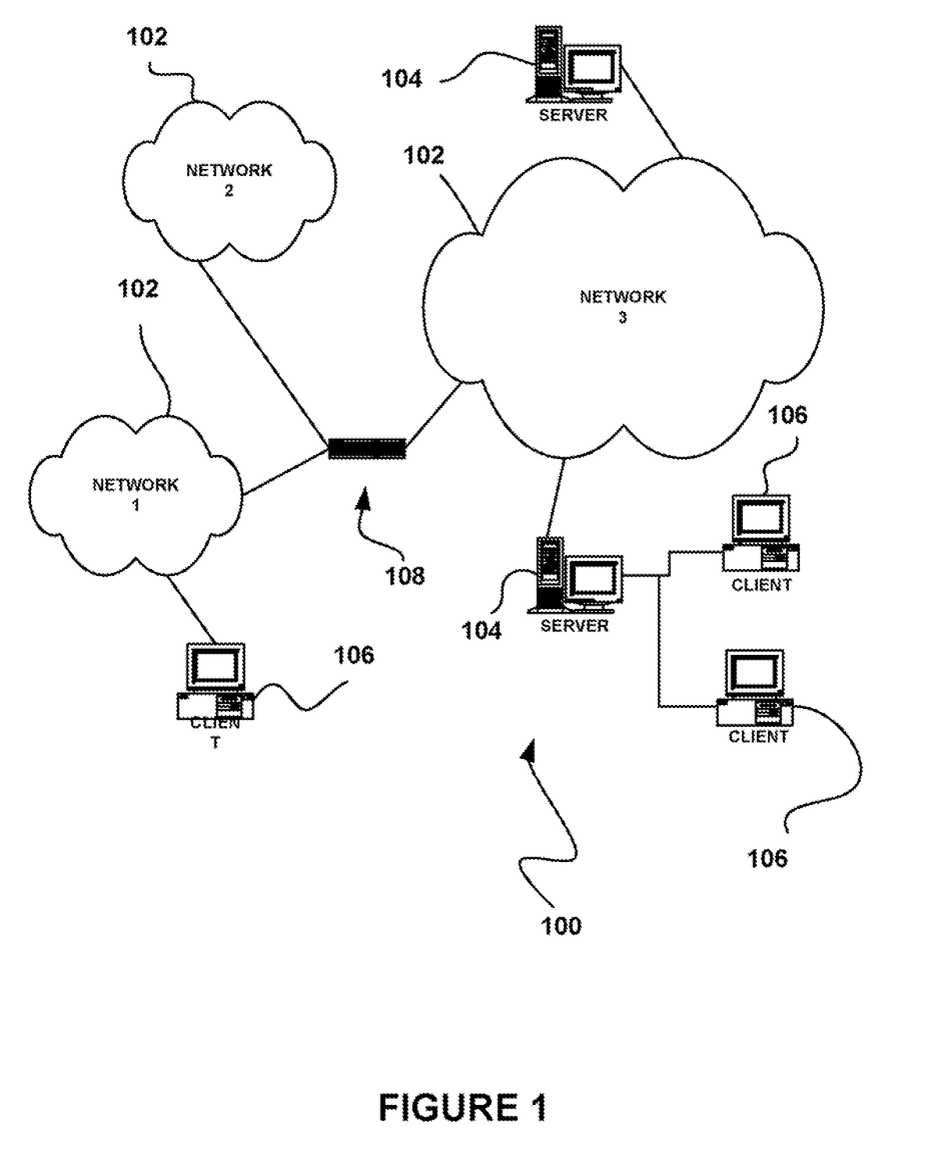
FIG. 1 illustrates a network architecture, in accordance with one embodiment.

FIG. 1 illustrates a network architecture 100, in accordance with one embodiment. As shown, a plurality of networks 102 is provided. In the context of the present network architecture 100, the networks 102 may each take any form including, but not limited to a local area network (LAN), a wireless network, a wide area network (WAN) such as the Internet, peer-to-peer network, etc.

Coupled to the networks 102 are servers 104 which are capable of communicating over the networks 102. Also coupled to the networks 102 and the servers 104 is a plurality of clients 106. Such servers 104 and/or clients 106 may each include a desktop computer, lap-top computer, hand-held computer, mobile phone, personal digital assistant (PDA), peripheral (e.g. printer, etc.), any component of a computer, and/or any other type of logic. In order to facilitate communication among the networks 102, at least one gateway 108 is optionally coupled therebetween.

Figure 2:
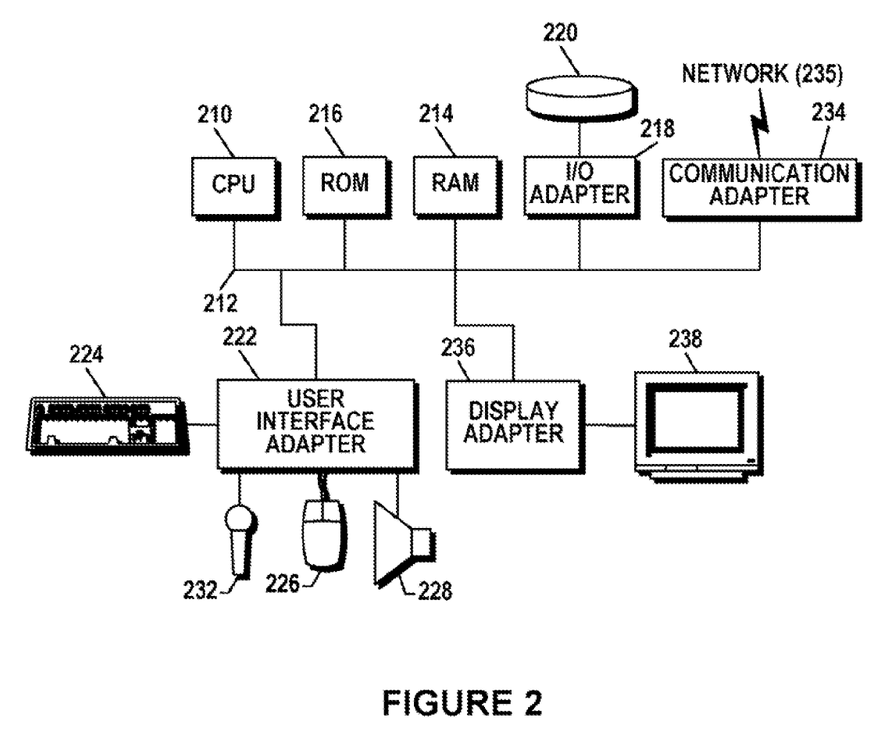
FIG. 2 shows a representative hardware environment that may be associated with the servers and/or clients of FIG. 1, in accordance with one embodiment.

FIG. 2 shows a representative hardware environment that may be associated with the servers 104 and/or clients 106 of FIG. 1, in accordance with one embodiment. Such figure illustrates a typical hardware configuration of a workstation in accordance with one embodiment having a central processing unit 210, such as a microprocessor, and a number of other units interconnected via a system bus 212.

The workstation shown in FIG. 2 includes a Random Access Memory (RAM) 214, Read Only Memory (ROM) 216, an IO adapter 218 for connecting peripheral devices such as disk storage units 220 to the bus 212, a user interface adapter 222 for connecting a keyboard 224, a mouse 226, a speaker 228, a microphone 232, and/or other user interface devices such as a touch screen (not shown) to the bus 212, communication adapter 234 for connecting the workstation to a communication network 235 (e.g., a data processing network) and a display adapter 236 for connecting the bus 212 to a display device 238.

The workstation may have resident thereon any desired operating system. It will be appreciated that an embodiment may also be implemented on platforms and operating systems other than those mentioned. One embodiment may be written using JAVA, C, and/or C++ language, or other programming languages, along with an object oriented programming methodology. Object oriented programming (OOP) has become increasingly used to develop complex applications.

Of course, the various embodiments set forth herein may be implemented utilizing hardware, software, or any desired combination thereof. For that matter, any type of logic may be utilized which is capable of implementing the various functionality set forth herein.

Figure 3:
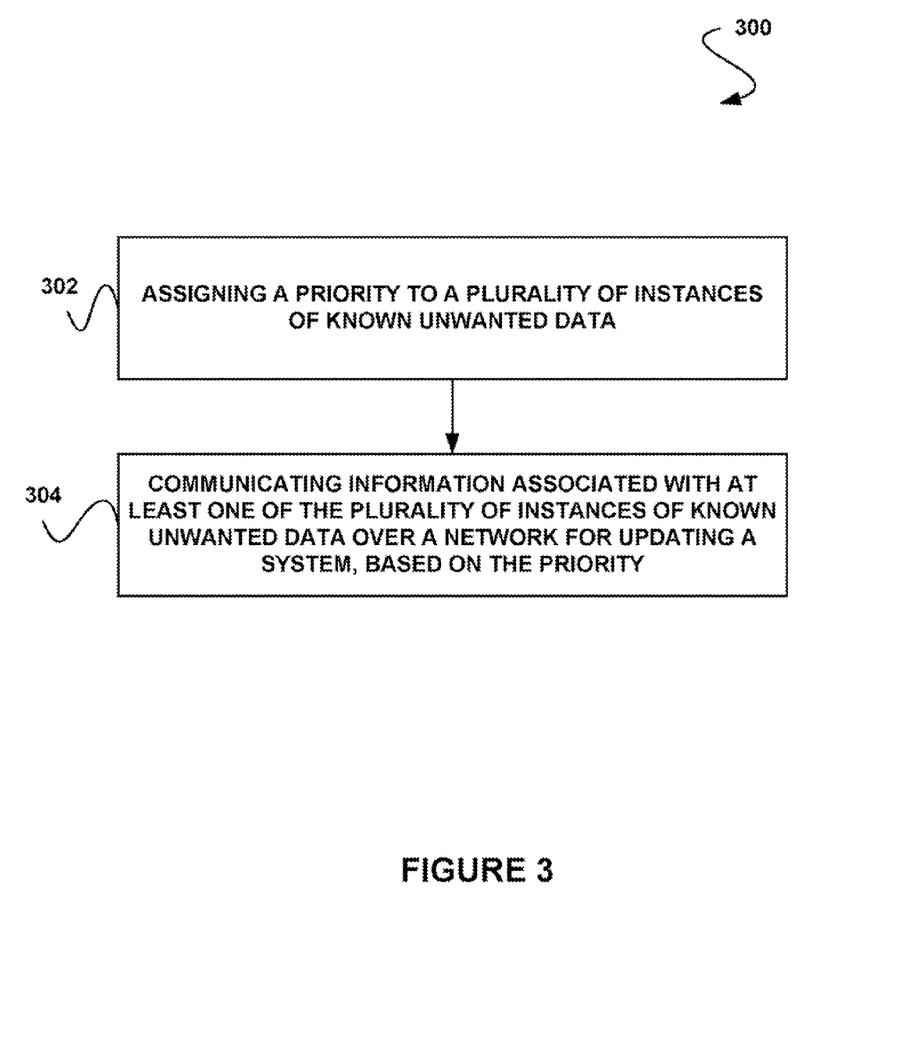
FIG. 3 shows a method for prioritizing instances of known unwanted data, in accordance with another embodiment.

FIG. 3 shows a method 300 for method for prioritizing instances of known unwanted data, in accordance with another embodiment. As an option, the method 300 may be carried out in the context of the architecture and environment of FIGS. 1 and/or 2. Of course, however, the method 300 may be carried out in any desired environment.

As shown in operation 302, a priority is assigned to a plurality of instances of known unwanted data. In the context of the present description, the instances of known unwanted data may include any instances of data predetermined to be unwanted. For example, the instances of known unwanted data may be predetermined to be unwanted automatically (e.g. utilizing a security program, etc.) or manually (e.g. via a user, etc.).

In various embodiments, the instances of known unwanted data may include malware (e.g. viruses, Trojan horses, worms, adware, spyware, etc.). In additional embodiments, the instances of known unwanted data may include electronic mail (e-mail) messages (e.g. spam, etc.), various web content, etc. In additional embodiments, the instances of known unwanted data may include exploits for vulnerabilities, etc.

Of course, the instances of known unwanted data may include anything that meets the above definition.

Further, the priority assigned to the instances of known unwanted data may include a numerical priority (e.g. first, second, third, etc.), a priority level (e.g. high, medium, low, etc.), and/or any other desired type of priority capable of indicating an order, rank, etc. In one embodiment, the priority may be able to reflect information like severity, threat level and/or other associated information. In another embodiment, a different priority may be assigned to each of the instances of known unwanted data. Thus, each instance of the known unwanted data may be assigned a unique priority. For example, a first instance of known unwanted data may be assigned a first priority, a second instance of known unwanted data may be assigned a second priority, and so forth.

In yet another embodiment, a same priority may be assigned to at least a portion of the instances of known unwanted data. In this way, multiple instances of known unwanted data may be assigned the same priority. For example, a first and second instance of known unwanted data may be assigned a first single priority; and a third, fourth, and fifth instance of known unwanted data may be assigned a second single priority, etc.

The priority assigned to the instances of known unwanted data may, in one embodiment, be based on a classification of each type of unwanted data. For example, a first classification may be based on defining a global threat condition (e.g. critical threat level, high threat level, etc.). This, in turn, may again be classified by identifying a distribution level (e.g. high, medium, low, etc.). Such distribution level classification may be first identified utilizing any data (e.g. details, etc.) associated with each of the instances of known unwanted data. For example, the classification may be based on a type (e.g. Trojan, virus, etc.), a manner in which each instance of known unwanted data proliferates, a vulnerability exploited, and/or any other details associated with each of the instances of known unwanted data. Of course, however, the priority may be assigned to the instances of known unwanted data in any desired manner.

To this end, a plurality of priorities may each be predefined as being associated with a particular set of details capable of being associated with the instances of known unwanted data. In this way, instances of known unwanted data associated with any particular set of details may be assigned the priority corresponding with such particular set of details. Of course, it should be noted that the priority may be assigned based on any desired criteria.

Just by way of example, instances of known unwanted data capable of causing more damage, capable of proliferating more quickly, etc. may be assigned a higher priority with respect to other instances of known unwanted data. As another example, instances of known unwanted data that are associated with zero day attacks may be assigned a higher priority than other instances of known unwanted data.

Still yet, information associated with at least one of the instances of known unwanted data is communicated over a network for updating a system, based on the priority. Note operation 304. In the context of the present embodiment, the information may include any data, details, code, etc. associated with at least one of the instances of known unwanted data. For example, in one embodiment, the information may include a signature (e.g. hash, checksum, pattern, heuristic description, unique identifier, etc.) of at least one of the instances of known unwanted data.

In another embodiment, the information may include a detection technique associated with at least one of the instances of known unwanted data. For example, the detection technique may be utilized for detecting occurrences of the associated instance of the known unwanted data. In yet another embodiment, the information may include a cleaning operation. The cleaning operation may be utilized for cleaning detected occurrences of the associated instance of the known unwanted data, for example.

In still yet another embodiment, the information may include formation information. Such formation information may indicate a formation (e.g. format, etc.) of the associated instance of known unwanted data. It should be noted that, while various examples of information have been described herein, any other information capable of being associated with an instance of known unwanted data may also be communicated over the network to the system. Further, in one embodiment, the present information may be stored in a database in association with the priority corresponding with the same particular instance of known unwanted data.

Moreover, the network over which the information is communicated may include any network capable of facilitating such communication. Just by way of example, the network may include any of the networks described above with respect to FIG. 1. Further, the system may include any system (e.g. security system, etc.) capable of being updated utilizing the communicated information. In one embodiment, the system may include an application program (e.g. security program, virus scanner, filtering program, etc.). In another embodiment, the system may utilize the communicated information for detecting, cleaning, etc. occurrences of known unwanted data.

To this end, information associated with at least one instance of known unwanted data may be included in an update. Accordingly, the update may be utilized for updating the system to deal with such at least one instance. In one embodiment, the update may only include information associated with instances of known unwanted data that have not been previously communicated over the network for updating the system. For example, only new information may be communicated for updating the system (e.g. for efficiency purpose, etc.). As a result, repeated communication of the same information over the network may be prevented, at least in part.

Additionally, the information may be communicated over the network in any desired manner that is based on the priority. In one embodiment, information associated with a highest priority instance of known unwanted data may be communicated prior to information associated with any other lower priority. Just by way of example, information associated with a first instance of the known unwanted data that is assigned a first priority may be communicated over the network for updating the system prior to information associated with a second instance of the known unwanted data that is assigned a second (e.g. lower) priority. As another example, information associated with a first set of instances of known unwanted data that are assigned a first priority may be communicated over the network for updating the system prior to information associated with a second set of instances of known unwanted data that are assigned a second (e.g. lower) priority.

To this end, information associated with instances of known unwanted data may be communicated over a network for updating a system, based on a priority of each of the instances of known unwanted data. Just by way of example, information associated with instances of the unwanted data that cause more destruction, or that proliferate across a network faster, etc. may optionally be communicated over the network first for updating the system to protect an associated device (e.g. such as any of the clients and/or servers described above with respect to FIGS. 1 and/or 2).

As another example, systems located on devices (e.g. wireless devices, etc.) which utilize low bandwidth network connections for receiving the information may receive information based on such priority, thus ensuring the establishment of protective measures associated with high priority instances of known unwanted data before doing the same for lower priority instances of known unwanted data. Further, such prioritization of instances of known unwanted data may optionally ensure faster protection with respect to zero day attacks than other types of instances of known unwanted data.

More illustrative information will now be set forth regarding various optional architectures and features with which the foregoing technique may or may not be implemented, per the desires of the user. It should be strongly noted that the following information is set forth for illustrative purposes and should not be construed as limiting in any manner. Any of the following features may be optionally incorporated with or without the exclusion of other features described.

Figure 4:
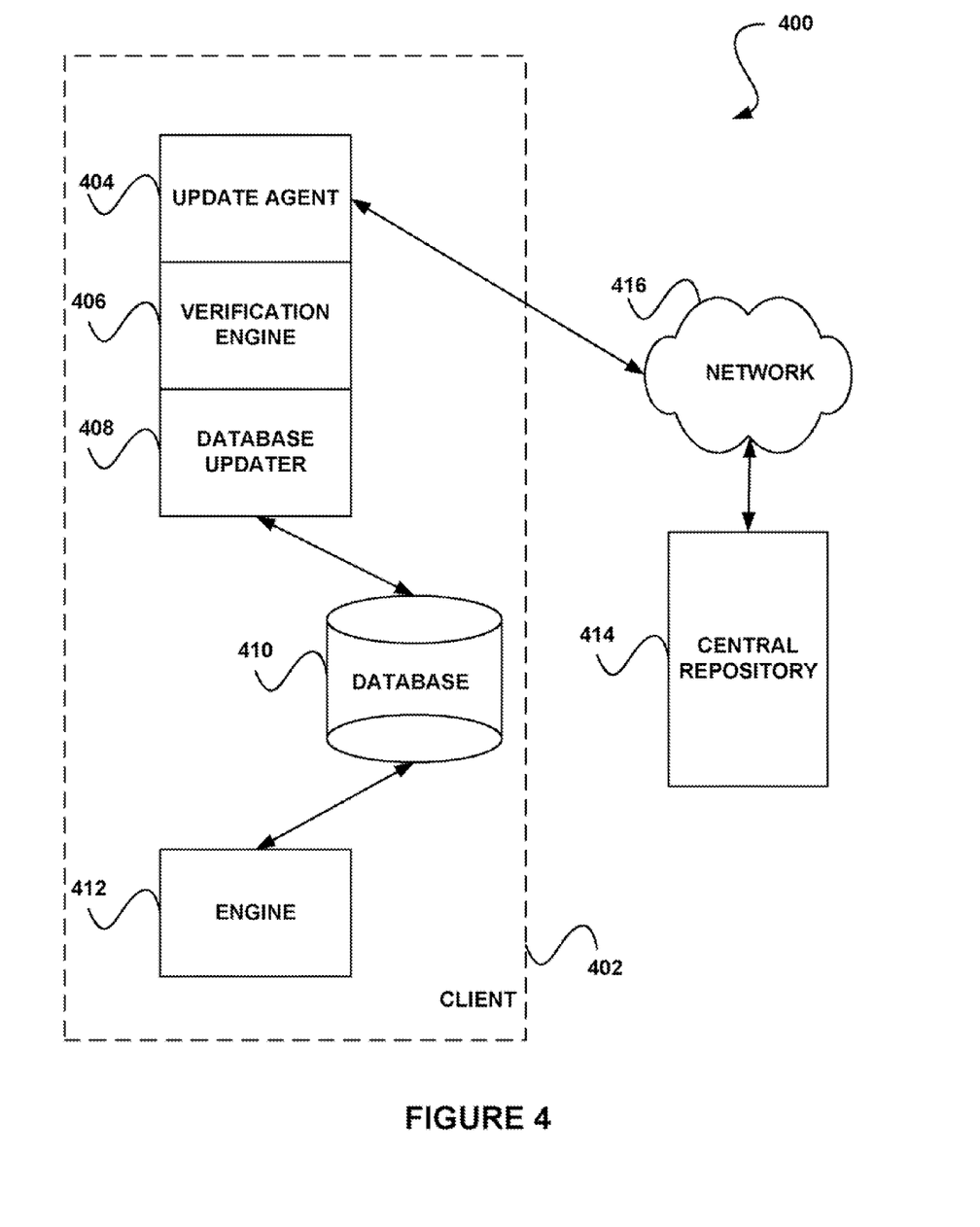
FIG. 4 shows a system for prioritizing instances of known unwanted data, in accordance with yet another embodiment.

FIG. 4 shows a system 400 for prioritizing instances of known unwanted data, in accordance with yet another embodiment. As an option, the system 400 may be implemented in the context of the architecture and functionality of FIGS. 1-3. Of course, however, the system 400 may be implemented in any desired environment. It should also be noted that the aforementioned definitions may apply during the present description.

As shown, a client 402 is in communication with a central repository 414 via a network 416. The client 402 may include any device capable of detecting occurrences of known unwanted data, as described in more detail below. For example, the client 402 may include any of the clients (and optionally servers) described above with respect to FIGS. 1 and/or 2. It should be noted that, while only a single client 402 is shown in FIG. 4, a plurality of clients 402 may also be in communication with the central repository 414 via the network 416.

In addition, the network 416 may include any network capable of facilitating communication between the client 402 and the central repository 414, such as, for example, any of the networks described above with respect to FIG. 1. Furthermore, the central repository 414 may optionally be located on a server (not shown). Such server may also include any of the servers (and optionally clients in a peer-to-peer arrangement) described above with respect to FIGS. 1 and/or 2.

The central repository 414 stores information (e.g. signatures, etc.) associated with instances of known unwanted data. In one embodiment, the information stored in the central repository 414 may be determined utilizing the server (not shown). In addition, the central repository 414 stores a priority in association with the information of each of the known unwanted data instances.

To this end, the central repository 414 may include any data structure capable of storing information and priorities associated with instances of known unwanted data. For example, the central repository 414 may store a plurality of files [e.g. a virus definitions file, new exploit information, detection techniques, etc.], and each file may be assigned a unique number (e.g. a version number, a date, etc.). The files may each further include information associated with a plurality of instances of known unwanted data, optionally along with the priorities associated therewith.

As an option, each file may store information associated with different instances of known unwanted data. In this way, the files may include a series of versions, where each subsequent version includes only information associated with newly discovered instances of known unwanted data. Further, folders identified by the unique numbers may be stored in the central repository 414, such that files associated with a particular unique number of a folder may be stored therein. As an option, the information stored in the central repository 414 may be displayed, along with an optional associated threat level, etc. on a web site (e.g. a provider's web site, etc.).

The client 402 includes an update agent 404 which is utilized for receiving the information associated with instances of known unwanted data from the central repository 414 via the network. In one embodiment, the update agent 404 may pull the information associated with instances of known unwanted data from the central repository 414. Of course, as another option, the central repository 414 may also push such information to the update agent 404.

In another embodiment, the update agent 404 may receive the information included within a particular folder stored in the central repository 414. For example, the update agent 404 may receive information included within a folder identified by a particular unique number. Such particular unique number may include a latest unique number for a folder in the central repository 414 that has been made available, a unique number that is subsequent to a last unique number for which the update agent 404 received information, etc. Thus, the update agent 404 may only receive new information associated with newly identified instances of known unwanted data.

Moreover, the update agent 404 receives the information based on the priorities associated with each of the respective instances of known unwanted data. For example, the update agent 404 may receive information associated with instances of known unwanted data that have been assigned a first priority prior to receiving information associated with those that have been assigned a second (e.g. lower) priority. Thus, the update agent 404 may optionally be capable of pulling the information from the central repository 414 based on the prioritization of the associated instances of known unwanted data.

The client 402 also includes a verification engine 406. The verification engine 406 may optionally be utilized for verifying whether information received from the central repository 414 has not previously been received. Thus, the verification engine 406 may ensure that the information is in fact new.

Still yet, the client 402 includes a database updater 408. In one embodiment, the database updater 408 may update the database 410 stored on the client 402 with the information received from the central repository 414 and optionally verified by the verification engine 406. Thus, the database 410 on the client 402 may store information associated with instances of known unwanted data that have been received from the central repository 414.

Further, the engine 412 located on the client 402 may utilize the information in the database 410 for scanning the client 402 for occurrences of known unwanted data. Just by way of example, the engine 412 may compare signatures in the database 410 with contents of the client 402 for determining whether corresponding instances of known unwanted data are present on the client 402. As another example, the engine 412 may utilize cleaning operations indicated by the information in the database 410, for cleaning instances of known unwanted data that are detected on the client 402.

To this end, the client 402 may only receive updated information that is not already included in the database 410 on the client 402. Accordingly, unnecessary overwriting of information within the database 410 may be prevented, at least in part. In addition, communication of information associated with all instances of known unwanted data may also be prevented (by only communicating such new information), thus reducing the amount of traffic transmitted over the network 416.

Furthermore, only communicating such new information may reduce a load on the central repository 414 (and a server associated therewith), which results from multiple clients (including client 402) accessing and receiving the information from the central repository 414. Thus, accessibility to the central repository 414 by the client 402 may be optimized. Still yet, the information associated with the instances of known unwanted data may be received by the client 402 based on priorities of such instances of known unwanted data. To this end, the engine 412 may be capable of scanning for high priority instances of known unwanted data (e.g. highly destructive, etc.) without necessarily waiting for receipt of information associated with lower priority instances of known unwanted data.

Figure 5:
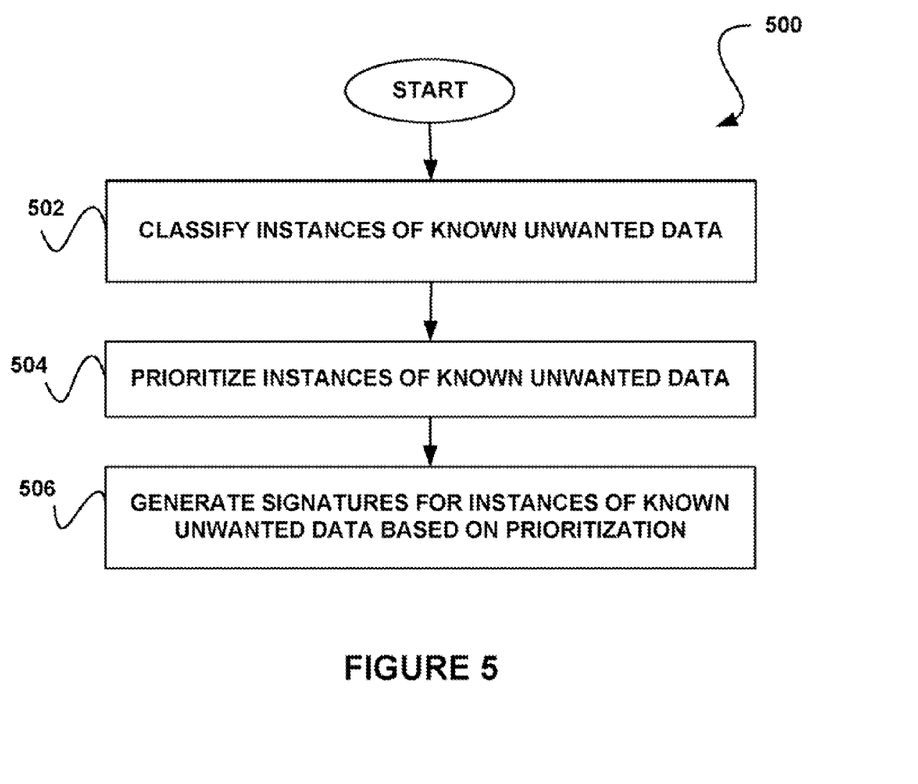
FIG. 5 shows a method for generating signatures for instances of known unwanted data at a server based on a prioritization of the instances of the known unwanted data, in accordance with still yet another embodiment.

FIG. 5 shows a method 500 for generating signatures for instances of known unwanted data at a server based on a prioritization of the instances of known unwanted data, in accordance with still yet another embodiment. As an option, the method 500 may be carried out in the context of the architecture and environment of FIGS. 1-4. For example, the method 500 may be used to populate the central repository 414 of FIG. 4. Of course, however, the method 500 may be carried out in any desired environment. It should also be noted that the aforementioned definitions may apply during the present description.

As shown in operation 502, instances of known unwanted data are classified. For example, the instances of known unwanted data may be classified utilizing any details (e.g. data) associated therewith. In one embodiment, the classification may be based on a type of each of the instances of known unwanted data. Such type may identify whether each instance of known unwanted data is a virus (and optionally a type of the virus), adware, a worm, a blended threat, etc. As another option, the type may indicate whether each instance of known unwanted data includes a code obfuscation threat which is encrypted, polymorphic, metamorphic, etc.

In another embodiment, the classification may be based on a manner in which each of the instances of known unwanted data proliferates. As an option, such proliferation may include infecting various devices (e.g. clients and/or servers) across a network. For example, the manner in which each of the instances of known unwanted data proliferate may involve an e-mail attachment, a download from a network, and/or an in-memory operation, payload delivery, exploitation, etc.

In yet another embodiment, the classification may be based on a vulnerability exploited by each of the instances of known unwanted data. In still yet another embodiment, the classification may be based on a distribution level associated with each of the instances of known unwanted data. Such distribution level may indicate the level of extent to which the instances of known unwanted data are widespread, based on predefined levels (e.g. high, medium, low, etc.).

In another embodiment, the classification may be based on a global threat condition associated with each of the instances of known unwanted data. The global threat condition may indicate the level of likelihood that the instances of the unwanted data will become widespread within a particular time period (e.g. critical threat level, high threat level, etc.). As another option, the global threat condition may indicate the amount of different platforms on which the instance of known unwanted data may be present. Of course, however, the classification may be based on any other details associated with each of the instances of known unwanted data.

Furthermore, as an option, the instances of known unwanted data may be classified utilizing a hierarchy of categories, where such categories are associated with various details capable of being associated with each of the instances of known unwanted data. For example, a particular path within the hierarchy of categories may be associated with a predetermined classification.

In addition, as shown in operation 504, the instances of known unwanted data are prioritized. In one embodiment, the prioritization may be based on the classification described in operation 502. For example, each classification may be associated with a particular priority. As an option, multiple classifications may also be associated with the same priority. In this way, each instance of known unwanted data may be assigned a priority.

Still yet, signatures are generated for the instances of known unwanted data based on the prioritization. Note operation 506. In one embodiment, signatures may be generated for instances of known unwanted data associated with a high priority prior to generating signatures for instances of known unwanted data associated with a lower priority. In this way, signatures for high priority instances of known unwanted data may be available for communication to a client prior to signatures for lower priority instances of known unwanted data. As an option, in response to the generation of a signature, the signature may be stored in a central repository (such as the central repository 414 in FIG. 4 described above) for communication thereof to any number of different remote clients. In addition, a priority of each of the instances of known unwanted data from which the signatures were generated may also be stored in the central repository.

Table 1 illustrates one example of a central repository in which signatures and associated priorities are stored. Of course, it should be noted that the central repository in Table 1 is presented for illustrative purposes only, and thus should not be construed as limiting in any manner. For example, such table may also contain information such as severity, threat level, and/or other associated information. Such information can even be used to define a global threat level. Also, it can be used to query information like data type, method of removal etc. To this end, a repository is provided that contains all desired information such as data type, method of removal, infection strategies, loss it can do to a machine, date of release in the market by unsolicited groups, etc.

TABLE 1

| SIGNATURE_1 | PRIORITY_1 |
|---|---|
| SIGNATURE_2 | PRIORITY_2 |
| SIGNATURE_3 | PRIORITY_3 |

Figure 6:
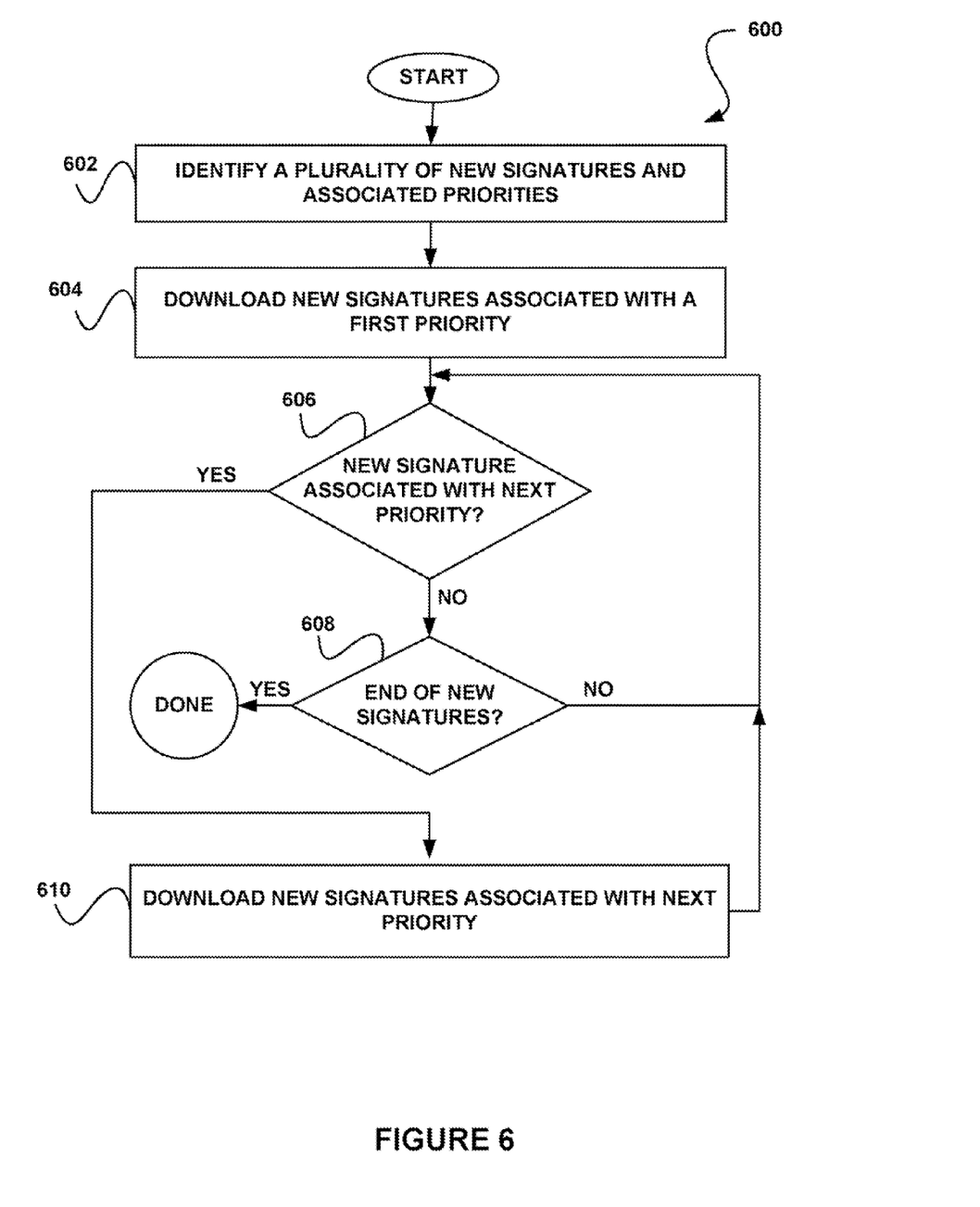
FIG. 6 shows a method for downloading signatures of instances of known unwanted data at a client based on associated priorities, in accordance with another embodiment.

FIG. 6 shows a method 600 for downloading signatures of instances of known unwanted data at a client based on associated priorities, in accordance with another embodiment. As an option, the method 600 may be carried out in the context of the architecture and environment of FIGS. 1-5. For example, the method 600 may be used to populate the database 410 of the client 402 of FIG. 4. Of course, however, the method 600 may be carried out in any desired environment. It should also be noted that the aforementioned definitions may apply during the present description.

As shown in operation 602, a plurality of new signatures and associated priorities are identified. In the context of the present embodiment, the associated priorities may include priorities of the instances of known unwanted data for which the signatures were generated. In addition, the new signatures and associated priorities may be identified from a central repository (such as the central repository 414 in FIG. 4 described above), and such central repository may optionally be located at a remote server (such as the server described above with respect to FIG. 5).

The new signatures and associated priorities may be identified in any desired manner. In one embodiment, the new signatures and associated priorities may be identified utilizing a version associated therewith. For example, such version may be indicated by a folder and/or file in which signatures are stored. As an option, a next available version of signatures and associated priorities may be determined based on a previous version of received signatures and associated priorities. As another option, a latest available version of signatures and associated priorities may be identified.

In another embodiment, the new signatures and associated priorities may be identified based on an automatically generated alert. For example, an alert may be generated whenever new signatures are available (e.g. at the central repository). Optionally, such alert may only be generated when new signatures associated with at least a predefined priority (e.g. or higher) are available. In yet another embodiment, the new signatures and associated priorities may be identified based on a manually initiated request to search for the new signatures and associated priorities.

Additionally, new signatures associated with a first priority are downloaded, as shown in operation 604. Such new signatures associated with the first priority may be downloaded in response to the identification of the new signatures and associated priorities (operation 602). In the context of the present description, the first priority may include the highest priority associated with at least one of the new signatures. Thus, new signatures associated with a highest priority may be downloaded to a client (or a plurality of clients) prior to any other new signatures associated with lower priorities.

Furthermore, it is determined whether any new signatures are associated with a next priority, as shown in decision 606. Such next priority may include a priority that is subsequent to the first priority. Just by way of example, if the first priority is a level "1", then the next priority may be a level "2". As another example, if the first priority is "high", then the next priority may be "medium". In one embodiment, the determination may include determining whether any of the new signatures identified in operation 602 are associated with such next priority.

If it is determined in decision 606 that at least one new signature is associated with the next priority, any new signature associated with such next priority is downloaded. Note operation 610. It is then again determined whether any new signatures are associated with yet another next priority, as shown in decision 606. In this way, new signatures are downloaded in order of the associated priorities.

In response to a determination in decision 606 that at least one new signature is not associated with a next priority, it is further determined whether the end of the new signatures has been reached. Note operation 608. In one embodiment, the end of the new signatures may be reached when all of the new signatures (e.g. as identified in operation 602) have been downloaded. If it is determined in decision 608 that the end of the new signatures has not been reached, it is again determined whether any new signatures are associated with yet another next priority, as shown in decision 606. Once it is determined that the end of the new signatures has been reached, the method 600 is terminated.

Figure 7:
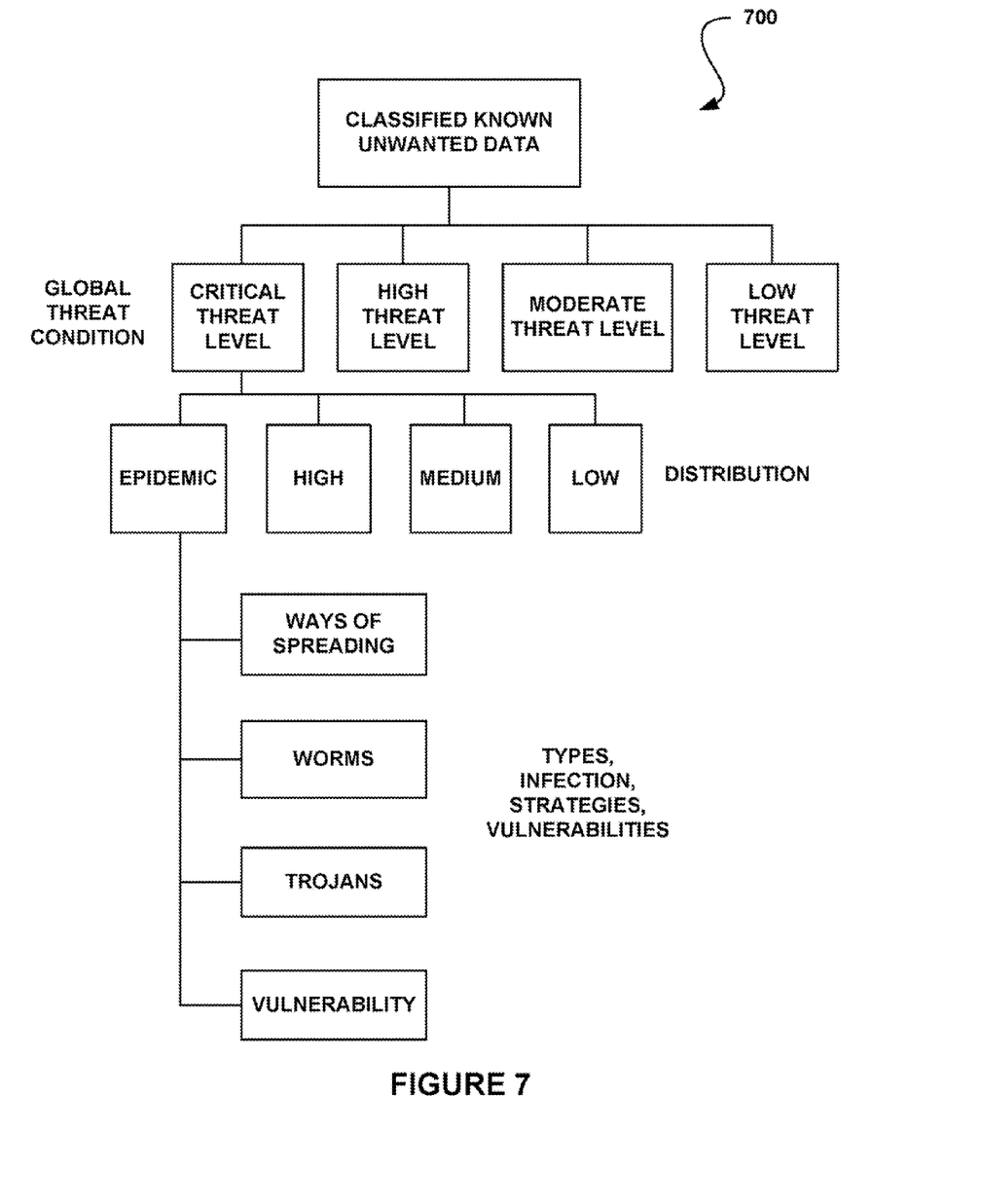
FIG. 7 shows a system for classifying known unwanted data, in accordance with yet another embodiment.

FIG. 7 shows a system 700 for classifying known unwanted data, in accordance with yet another embodiment. As an option, the system 700 may be implemented in the context of the architecture and environment of FIGS. 1-6. For example, the system 700 may be used in conjunction with operation 502 in FIG. 5. Of course, however, the system 700 may be implemented in any desired environment. It should also be noted that the aforementioned definitions may apply during the present description.

As shown, instances of known unwanted data are classified utilizing a hierarchy of various categories. Such categories include various details capable of being associated with the instances of known unwanted data. For example, the categories include a level of a global threat condition associated with an instance of known unwanted data, a distribution level associated with an instance of known unwanted data, etc.

It should be noted that any of the categories shown may be expanded to include any desired sub-categories. For example, the category indicating the type of vulnerability exploited by a particular instance of known unwanted data may be expanded to include all possible vulnerabilities capable of being exploited by instances of known unwanted data. As another example, the category indicating the manner in which a particular instance of known unwanted data may proliferate may be expanded to include all possible known manners in which instances of known unwanted data may proliferate.

Of course, it should also be noted that any other desired categories of details capable of being associated with instances of known data may also be included in the hierarchy. Further, each path in the hierarchy of various categories may be associated with a particular classification. In this way, each instance of known unwanted data may be classified based on details associated therewith.

While various embodiments have been described above, it should be understood that they have been presented by way of example only, and not limitation. Thus, the breadth and scope of a preferred embodiment should not be limited by any of the above-described exemplary embodiments, but should be defined only in accordance with the following claims and their equivalents.

What is claimed is:

1. A method to be performed in an electronic processing environment, comprising:
assigning a priority to a plurality of instances of known unwanted data, wherein the priority includes a distribution level characteristic associated with proliferation of each of the plurality of instances;
generating signatures for the plurality of instances of known unwanted data based on the assigned priority;
downloading a plurality of new signatures in response to identifying new signatures' associated priorities; and
communicating information associated with at least one of the plurality of instances of known unwanted data over a network as part of an update for a system, wherein the information includes a detection technique for detecting an occurrence of the at least one instance of known unwanted data, the information being associated with a highest priority instance of the known unwanted data, and being communicated ahead of other instances of the plurality of instances having a lesser priority.

2. The method of claim 1, wherein at least one of the plurality of instances of the known unwanted data includes at least one of malware, spyware, and key loggers.

3. The method of claim 1, wherein at least one of the plurality of instances of the known unwanted data includes unwanted mail messages.

4. The method of claim 1, wherein the priority is stored in a database in association with the information associated with the plurality of instances of the known unwanted data.

5. The method of claim 1, wherein assigning the priority includes assigning a different priority to each of the plurality of instances of the known unwanted data.

6. The method of claim 1, wherein assigning the priority includes assigning a same priority to at least a portion of the plurality of instances of the known unwanted data.

7. The method of claim 1, wherein the information associated with the at least one of the plurality of instances of the known unwanted data includes a signature of the at least one of the plurality of instances of the known unwanted data.

8. The method of claim 1, wherein the information associated with the at least one of the plurality of instances of the known unwanted data includes cleaning code utilized for cleaning the at least one of the plurality of instances of the known unwanted data.

9. The method of claim 1, wherein the information associated with the at least one of the plurality of instances of the known unwanted data includes formation information indicating a formation of the at least one of the plurality of instances of the known unwanted data.

10. The method of claim 1, wherein the update only includes information associated with instances of the known unwanted data not previously communicated over the network for updating the system.

11. The method of claim 1, wherein information associated with a first instance of the known unwanted data assigned a first priority is communicated over the network for updating the system prior to information associated with a second instance of the known unwanted data assigned a second priority.

12. The method of claim 1, wherein information associated with a first set of instances of the known unwanted data assigned a first priority are communicated over the network for updating the system prior to information associated with a second set of instances of the known unwanted data assigned a second priority.

13. The method of claim 1, wherein the priority assigned to the plurality of instances of the known unwanted data is based on a classification of each of the instances of the known unwanted data.

14. The method of claim 13, wherein the classification is based on at least one of a type of each of the plurality of instances of the known unwanted data, and a global threat condition associated with each of the plurality of instances of the known unwanted data.

15. The method of claim 1, further comprising generating the information associated with the at least one of the plurality of instances of the known unwanted data based on the priority.

16. The method of claim 1, wherein the system includes a security system.

17. A computer program product embodied on a non-transitory computer readable medium for performing operations, comprising:

assigning a priority to a plurality of instances of known unwanted data, wherein the priority includes a distribution level characteristic associated with proliferation of each of the plurality of instances;

generating signatures for the plurality instances of known unwanted data based on the assigned priority;

downloading a plurality of new signatures in resonance to identifying new signatures' associated priorities; and communicating information associated with at least one of the plurality of instances of known unwanted data over a network as part of an update for a system, wherein the information includes a detection technique for detecting an occurrence of the at least one instance of known unwanted data, the information being associated with a highest priority instance of the known unwanted data, and being communicated ahead of other instances of the plurality of instances having a lesser priority.

18. A system, comprising:

a processor, wherein the system is configured for:

assigning a priority to a plurality of instances of known unwanted data, wherein the priority includes a distribution level characteristic associated with proliferation of each of the plurality of instances;

generating signatures for the plurality of instances of known unwanted data based on the assigned priority;

downloading a plurality of new signatures in response to identifying new signatures' associated priorities; and communicating information associated with at least one of the plurality of instances of known unwanted data over a network as part of an update for a system, wherein the information includes a detection technique for detecting an occurrence of the at least one instance of known unwanted data, the information being associated with a highest priority instance of the known unwanted data, and being communicated ahead of other instances of the plurality of instances having a lesser priority.

19. The system of claim 18, further comprising memory coupled to the processor via a bus.

20. The method of claim 1, wherein the priority reflects a severity of the known unwanted data.

21. The method of claim 1, wherein the priority reflects a threat level of the known unwanted data.

22. The method of claim 1, wherein the updating utilizes an update agent for receiving the information associated with the at least one of the plurality of instances of known unwanted data.

23. The method of claim 22, wherein the update agent receives the information based on priorities associated with each of the instances of known unwanted data.

* * * * *

UNITED STATES PATENT AND TRADEMARK OFFICE
CERTIFICATE OF CORRECTION

PATENT NO. : 8,613,092 B2  
APPLICATION NO. : 11/751565  
DATED : December 17, 2013  
INVENTOR(S) : Manish Gupta

Page 1 of 1

It is certified that error appears in the above-identified patent and that said Letters Patent is hereby corrected as shown below:

In the Claims

In column 12, line 7, In Claim 17, delete "resonance" and insert -- response --, therefor.

Signed and Sealed this
Eighteenth Day of March, 2014

Michelle K. Lee
*Deputy Director of the United States Patent and Trademark Office*